United States Patent [19]

Miyazaki

[11] Patent Number: 5,514,944
[45] Date of Patent: May 7, 1996

[54] POWER CONVERTER

[75] Inventor: Satoshi Miyazaki, Kanagawa, Japan

[73] Assignee: Kabushiki Kaisha Toshiba, Kanagawa, Japan

[21] Appl. No.: 258,786

[22] Filed: Jun. 13, 1994

[30] Foreign Application Priority Data

Jun. 14, 1993 [JP] Japan .................. 5-141794

[51] Int. Cl.$^6$ ........................ H02P 5/34
[52] U.S. Cl. ............ 318/800; 318/801; 318/809; 363/37; 363/65; 363/71
[58] Field of Search .................. 318/800, 801, 318/809; 363/37, 65, 71

[56] References Cited

U.S. PATENT DOCUMENTS

| | | | |
|---|---|---|---|
| 4,310,791 | 1/1982 | Akamatsu | 318/800 |
| 5,070,440 | 12/1991 | Walker | 363/71 |
| 5,073,849 | 12/1991 | Morris | 363/118 |
| 5,274,542 | 12/1993 | Tanaka et al. | 363/96 |

FOREIGN PATENT DOCUMENTS

| | | | |
|---|---|---|---|
| 0534242 | 3/1993 | European Pat. Off. | H02M 7/48 |
| 4206263 | 9/1992 | Germany | H02M 7/48 |

*Primary Examiner*—William M. Shoop, Jr.
*Assistant Examiner*—Karen Mash
*Attorney, Agent, or Firm*—Finnegan, Henderson, Farabow, Garrett & Dunner

[57] ABSTRACT

A power converter having a DC power source and neutral point clamped inverters connected in common to the DC power source, to convert DC power from the DC power source into AC power and supply the AC power from the inverters to a load. The power converter includes a first voltage reference generating unit for generating a first voltage reference, and a phase difference determining unit for determining a phase difference between the inverters based on a number of the inverters and a number of phases per the inverter. The power converter further includes a second voltage reference generating unit for generating a second voltage reference based on the first voltage reference from the first voltage reference generating unit and the phase difference from the phase difference determining unit, and a comparing unit for comparing the voltage references with carrier signals repectively and for generating gate signals based on the comparison result to the inverters.

10 Claims, 10 Drawing Sheets

POWER CONVERTER

BACKGROUND OF THE INVENTION

1. Field of the Invention

This invention relates to a power converter, and more particularly to a power converter in which a plurality of neutral point clamped (NPC: Neutral Point Clamped) inverters are connected in common to a DC voltage source and which supplies the AC power obtained by these inverters to a load.

2. Description of the Related Art

Figure 11:
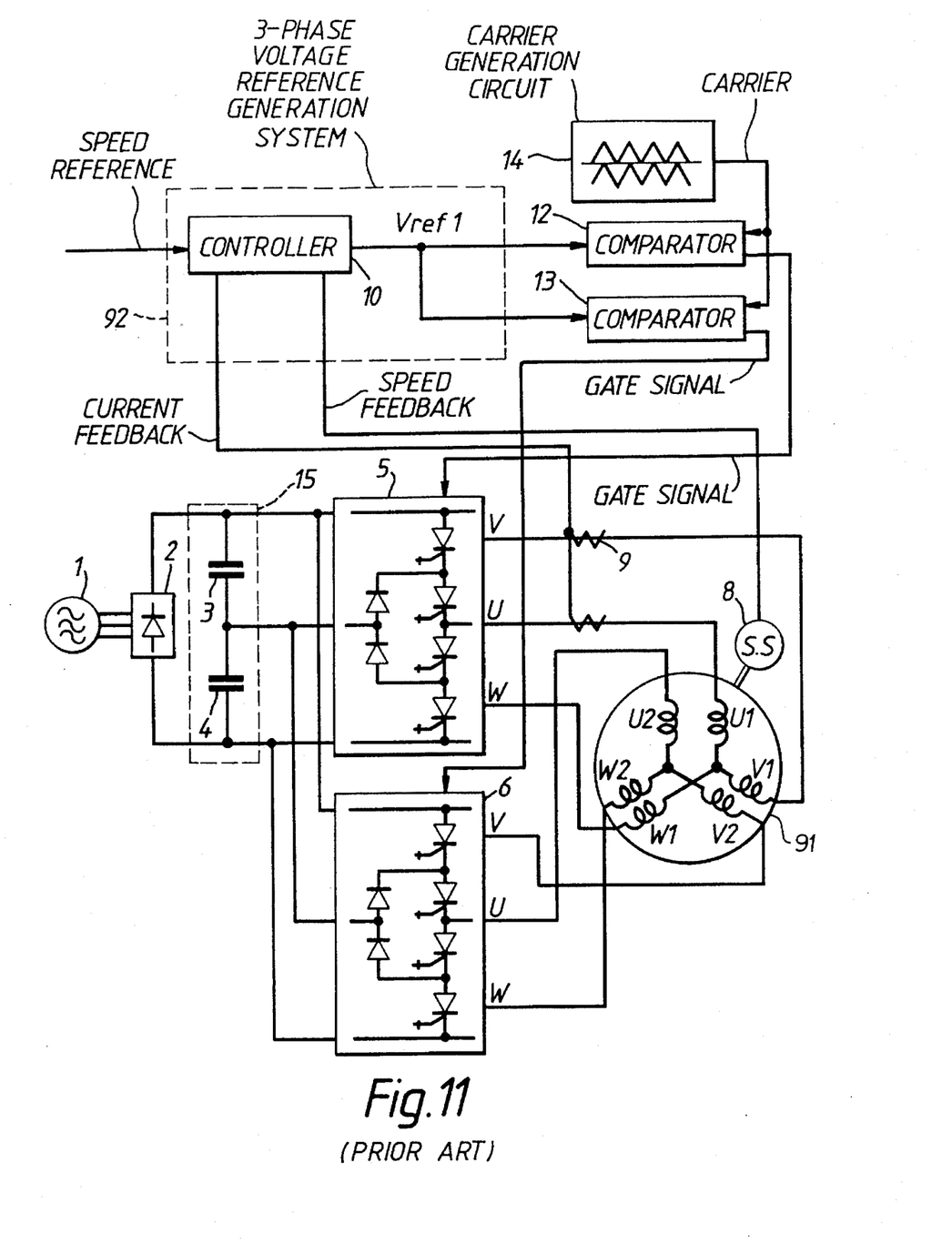
FIG. 11 is a schematic diagram showing a prior art power converter composed of two NPC inverters.

In prior art, there are some systems composed of two NPC inverters which have a common DC power source, as shown in FIG. 11 as an example. A rectifier 2 is connected to a 3-phase AC power source 1, and a DC smoothing capacitor 15 composed of a positive side smoothing capacitor 3 and a negative side smoothing capacitor 4. Also, a first NPC inverter 5 and a second NPC inverter 6 are connected in parallel to DC smoothing capacitor 15.

Figure 10:
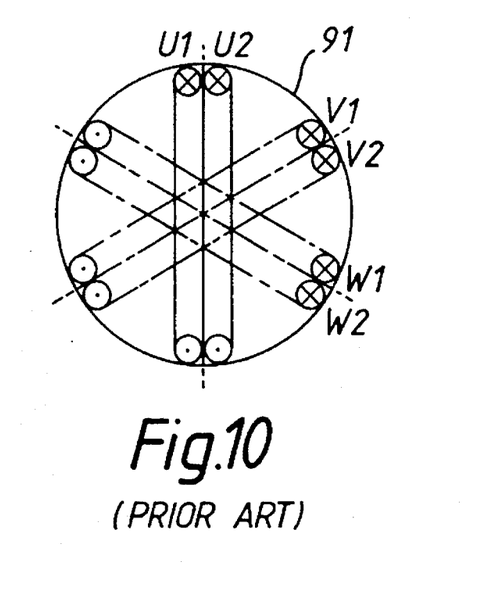
FIG. 10 is a winding composition drawing of a motor possessing two sets of 3-phase windings which is connected to a double NPC inverter composition of prior art.

The output sides of NPC inverters 5 and 6 are connected to a motor 91, which has two sets of 3-phase windings with the same number of polarities, as shown in FIG. 10. The AC power obtained by NPC inverters 5 and 6 is supplied to motor 91. Specifically, the U, V and W phase outputs of first NPC inverter 5 are connected to windings U1, V1 and W1 of motor 91, respectively. Also, the U, V and W phase outputs of second NPC inverter 6 are connected to windings U2, V2 and W2 of motor 91, respectively.

Gate signals are supplied to gates of NPC inverters 5 and 6 from a gate signal generating system composed of a controller 10, first and second comparators 12 and 13 and a carrier generation circuit 14. A motor speed of motor 91 detected by a speed detector 8 is fed back to controller 10 which composes a 3-phase voltage reference generation system 92. Speed control is exercised therein using this feedback data and an inputted speed reference. Motor currents of motor 91 detected by current detectors 9 connected to the output side of NPC inverter 5 are also fed back to controller 10 and current control is exercised therein. A 3-phase voltage reference Vref1 (only one phase component thereof is shown), which is the current control output, is outputted from controller 10. This 3-phase voltage reference Vref1 is inputted to each of comparators 12 and 13, and is compared in amplitude with a carrier generated by carrier generation circuit 14 therein. Thus, the gate signal for NPC inverter 5 and the gate signal for NPC inverter 6 are generated in comparators 12 and 13, respectively. Details of the system shown in FIG. 11 are described in U.S. Pat. No. 5,274,542 issued on Dec. 28, 1993.

As shown in FIG. 11, NPC inverters 5 and 6 are connected to rectifier 2. Therefore, compared with a composition in which one NPC inverter is connected to rectifier 2, the current capacity of this system is doubled. But, there is a problem in this system that the potential fluctuation of the neutral point, which is the mid-point of DC smoothing capacitor 15, also becomes doubled.

SUMMARY OF THE INVNETION

Accordingly, one object of this invention is to provide a power converter in which a plurality of NPC inverters are connected to a common DC power source, which can suppress the neutral point potential fluctuation generated due to the currents of each NPC inverter.

These and other objects of this invention can be achieved by providing a power converter having a DC power source and neutral point clamped inverters connected to the DC power source, to convert DC power from the DC power source into AC power and supply the AC power from the inverters to a load. The power converter includes a first voltage reference generating unit for generating a first voltage reference. The power converter further includes a second voltage reference generating unit for generating a second voltage reference based on the first voltage reference from the first voltage reference generating unit and a phase difference between the inverters based on a number of the inverters and a number of phases per inverter. A comparing unit compares the voltage references with carrier signals repectively and generates gate signals based on the comparison result to the inverters.

According to one aspect of this invention, there is provided a power converter including a DC voltage source, a plurality of neutral point clamped inverters connected to the DC voltage source, and a voltage reference generating unit for generating an original voltage reference and for generating the plurality of voltage references with a phase difference therebetween based on the original voltage reference. The phase difference between the voltage references is based on the number of the inverters. Each of the voltage references is a positive voltage reference produced by shifting the original voltage reference by a predetermined positive DC bias value in a positive mode and a negative voltage reference produced by shifting the original voltage reference by a predetermined negative DC bias value in a negative mode. The positive mode and the negative mode are switched alternately at a predetermined cycle. Switching timing between the positive mode and the negative mode is shifted by a time difference corresponding to the phase difference. The power converter also includes a gate signal generating unit connected to receive the plurality of the voltage references for generating the plurality of gate signals, each of which is supplied to one of the inverters, respectively. Each of the inverters outputs AC power based on one of the gate signals, respectively. The AC power is supplied to a load. Whereby a potential fluctuation of a neutral point of the inverters caused by output currents of the inverters is suppressed.

According to another aspect of this invention, there is provided a power converter having a DC power source and neutral point clamped inverters connected in common to the DC power source, to convert DC power from the DC power source into AC power and supply the AC power from the inverters to a load. The power converter includes a first voltage reference generating unit for generating a first voltage reference, and a polarity generating unit for generating a polarity signal. A second voltage reference generating unit generates a second voltage reference based on the first voltage reference from the first voltage reference generating unit and the polarity signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views, the embodiments of this invention will be described below.

Figure 1:
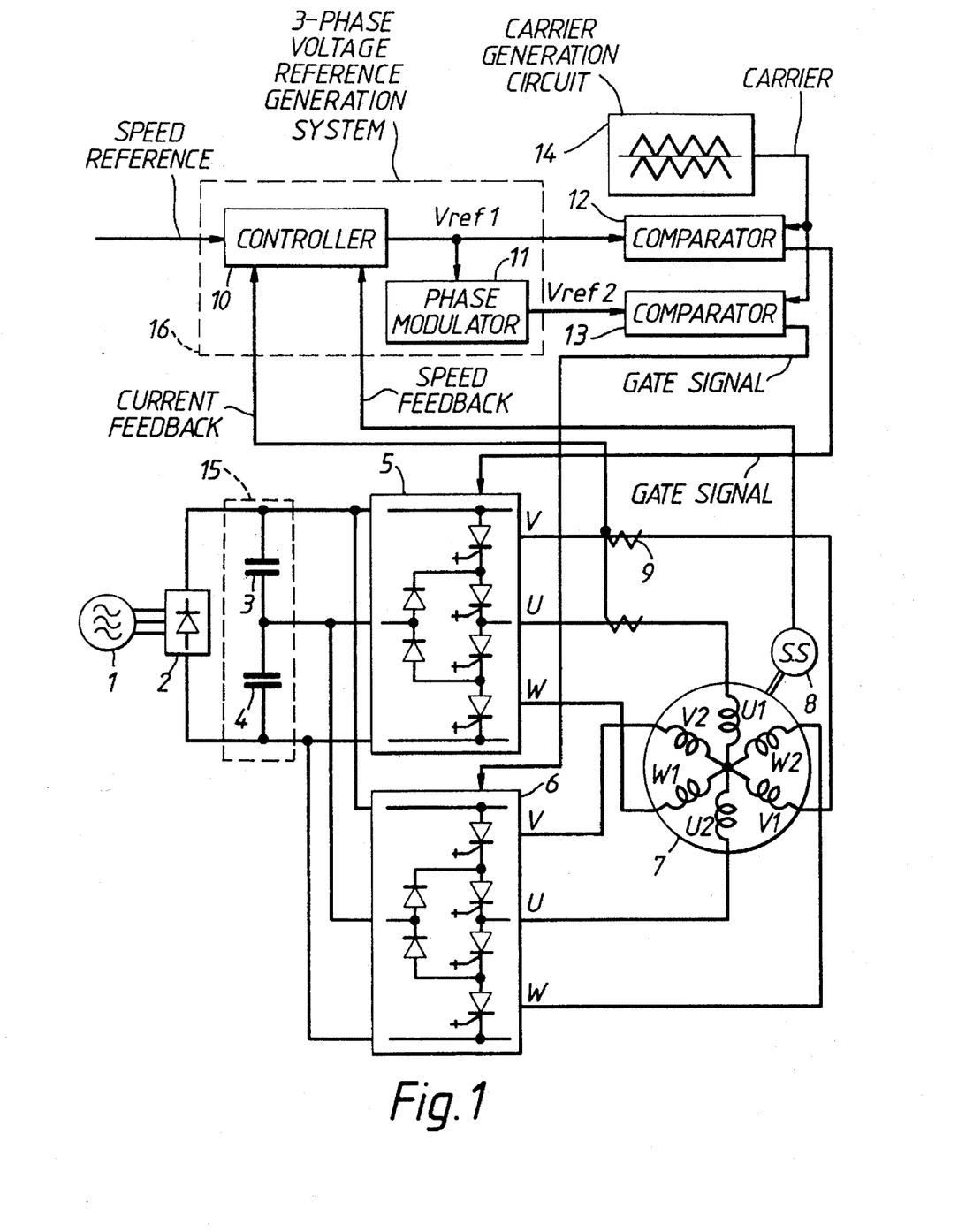
FIG. 1 is a schematic block diagram showing a power converter according to a first embodiment of this invention.

FIG. 1 is a schematic block diagram showing a power converter according to a first embodiment of this invention. Here, the main points of difference from the prior art example in FIG. 11 are described. The points which differ from those in FIG. 11 are a motor 7 and a 3-phase voltage reference generation system 16.

Figure 2:
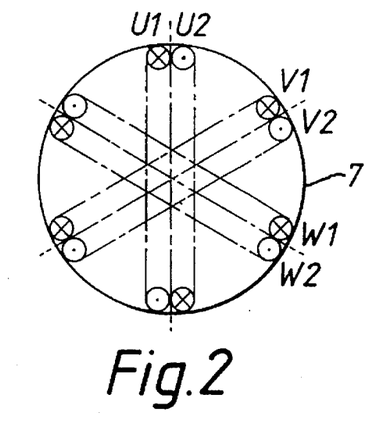
FIG. 2 is a winding arrangement diagram for the motor used in the embodiment in FIG. 1.

Motor 7 has two sets of 3-phase windings. Of these, one 3-phase winding is composed of phase windings U1, V1 and W1, while the other 3-phase winding is composed of phase windings U2, V2 and W2. As shown in FIG. 2, U-phase windings U1 and U2, V-phase windings V1 and V2 and W-phase windings W1 and W2 are respectively wound in opposite directions to each other. The output of first NPC inverter 5 is connected to phase windings U1, V1 and W1 while the output of second NPC inverter 6 is connected to phase windings U2, V2 and W2.

Figure 1A:
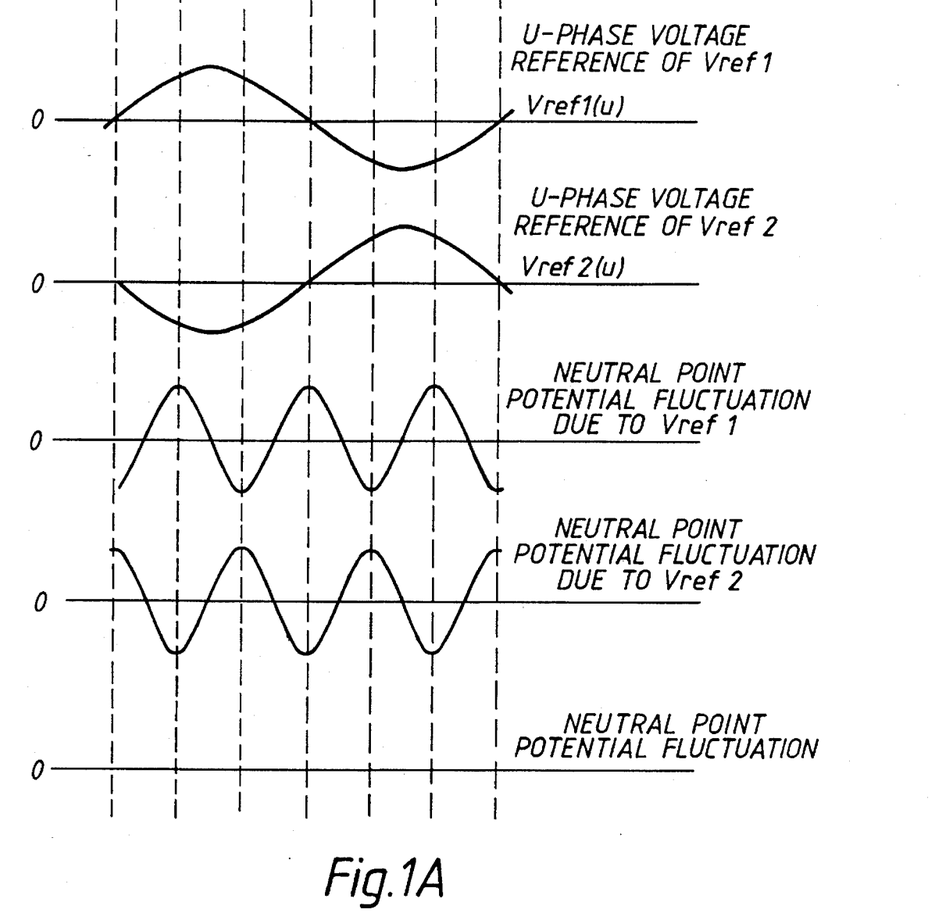
FIG. 1A is a wave-form chart of the voltage references and the neutral point potentials to illustrate the operation of the first embodiment shown in FIG. 1.

3-phase voltage reference generation system 16 is composed of controller 10 and a phase modulator 11. Controller 10 inputs speed detection signal from speed detector 8 and current detection signals from current detectors 9, together with a speed reference. Here, 3-phase voltage reference Vref1, which is the current control output, is outputted, the same as in the prior art system shown in FIG. 11. Also, phase modulator 11 receives a 3-phase voltage reference Vref1 and outputs a 3-phase voltage reference Vref2 of which the phase is shifted 180° from that of 3-phase voltage reference Vref1 as shown in FIG. 1A. A circuit construction of phase modulator 11 is obvious to those skilled in the art, so that detailed description thereof may be omitted.

3-phase voltage reference Vref1 from 3-phase voltage reference generation system 16 is inputted to first comparator 12 where amplitude comparison with the carrier generated by carrier generation circuit 14 is performed. First comparator 12 generates a gate signal for first NPC inverter 5 based on the comparison result. Also, 3-phase voltage reference Vref2 from 3-phase voltage reference generation system 16 is inputted to second comparator 13 where amplitude comparison with the carrier generated by carrier generation circuit 14 is performed. Second comparator 13 generates a gate signal for NPC inverter 6 based on the comparison result.

NPC inverters 5 and 6 convert the inputted DC powers into AC powers based on gate signals, and supply the AC powers to motor 7, respectively.

When using the first embodiment composed as described above, the following operational effects can be obtained. That is to say, the 3-phase voltage outputted from first NPC inverter 5 and the 3-phase voltage outputted from second NPC inverter 6 are 180° phase-shifted from each other. Therefore, for instance, when the output current from first NPC inverter 5 flows into the neutral point of DC smoothing capacitor 15, the output current of second NPC inverter 6 flows out from the neutral point. Thus, the neutral point potential fluctuations due to NPC inverters 5 and 6 cancel each other out, as shown in FIG. 1A.

Here, the phase difference between the windings of motor 7 and the phase difference between voltage references Vref1 and Vref2 outputted from 3-phase voltage reference generation system 16 are both made 180°. However, these phase differences may be a multiple, of 360°/(N·K), when taking N as the number of NPC inverters connected in parallel in a power converter and K as the number of phases per inverter. That is to say, because there are 2 inverters with 3 phases in this power converter, if the phase difference is selected to be a multiple of 60° the same effect as in the first embodiment can be obtained.

Also, when the number of NPC inverters is expressed by N=L+M (L and M are integers of 2 or more), even if the phase difference between motor windings and the phase difference between voltage references are determined in the case of "L" NPC inverters and in the case of "M" NPC inverters, respectively, the same effect can be obtained.

For example, take the case of 5 3-phase NPC inverters being connected and the motor possessing 5 sets of 3-phase windings, the NPC inverters may be divided into a set of 2 inverters and a set of 3 inverters. In the set of 2 inverters, both the phase difference between motor windings and phase difference between voltage references may be each taken as 180°, and in the 3-inverter set, they may be each taken as 120°. Even if the phase difference between the 2-inverter set and the 3-inverter set is determined arbitrarily, the same effect as in the first embodiment can be obtained.

Figure 3:
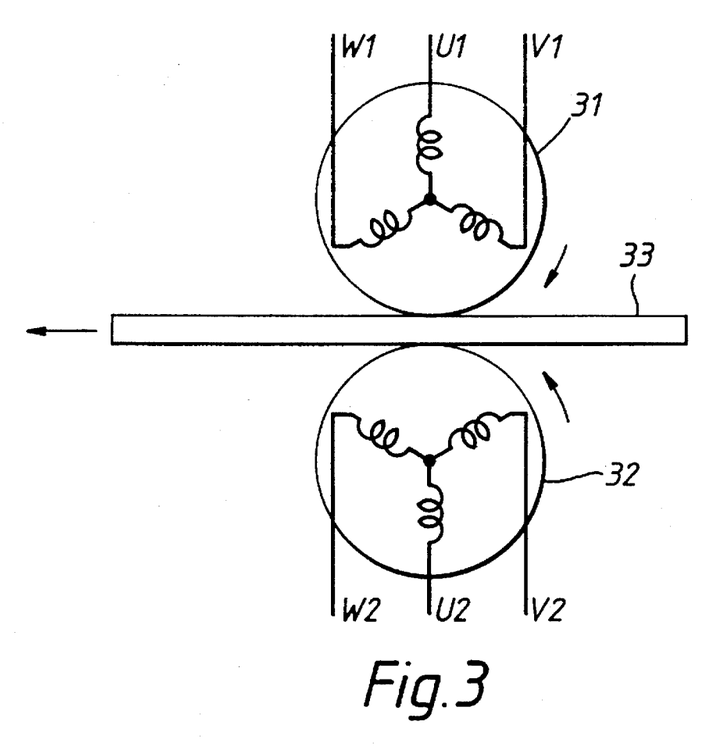
FIG. 3 is a composition drawing of motors and a load to illustrate the essential points of a power converter according to a second embodiment of this invention.

FIG. 3 is a drawing to illustrate a second embodiment of this invention. This is a case in which motor 7, which is the load in the first embodiment in FIG. 1, is substituted by 2 motors which drive the same one load, as shown in FIG. 3. That is to say, the system is composed of a first motor 31 and a second motor 32. These two motors 31 and 32 are provided for driving rolling mill rollers, and material 33 to be rolled is rolled by these rolling mill rollers. In this case, to move material 33 to be rolled in the direction of the arrow shown in FIG. 3, the phase orders of motors 31 and 32 are set as shown by the arrows in FIG. 3. The output of first NPC inverter 5 is connected to phase windings U1, V1 and W1 of motor 31, while the output of second NPC inverter 6 is connected to phase windings U2, V2 and W2 of motor 32.

The rest of the composition of this embodiment is the same as in FIG. 1. The design is that 3-phase voltage reference Vref1 is inputted to first comparator 12 which performs amplitude comparison with the carrier generated by carrier generation circuit 14 and generates a gate signal for first NPC inverter 5. Then, Vref1 is phase-shifted 180° by phase modulator 11 and becomes 3-phase voltage reference Vref2. This is inputted to second comparator 13. Amplitude comparison with the carrier is performed and a gate signal for second NPC inverter 6 is generated.

When using the second embodiment described above, apart from the effects of the first embodiment, the additional effect of being able to simplify the winding compositions of motors 31 and 32 is obtained.

Also, in the second embodiment, the voltage reference phase difference has been taken as 180°. However, it is not limited to this, and any value which is a multiple of 60° may be employed.

Figure 4:
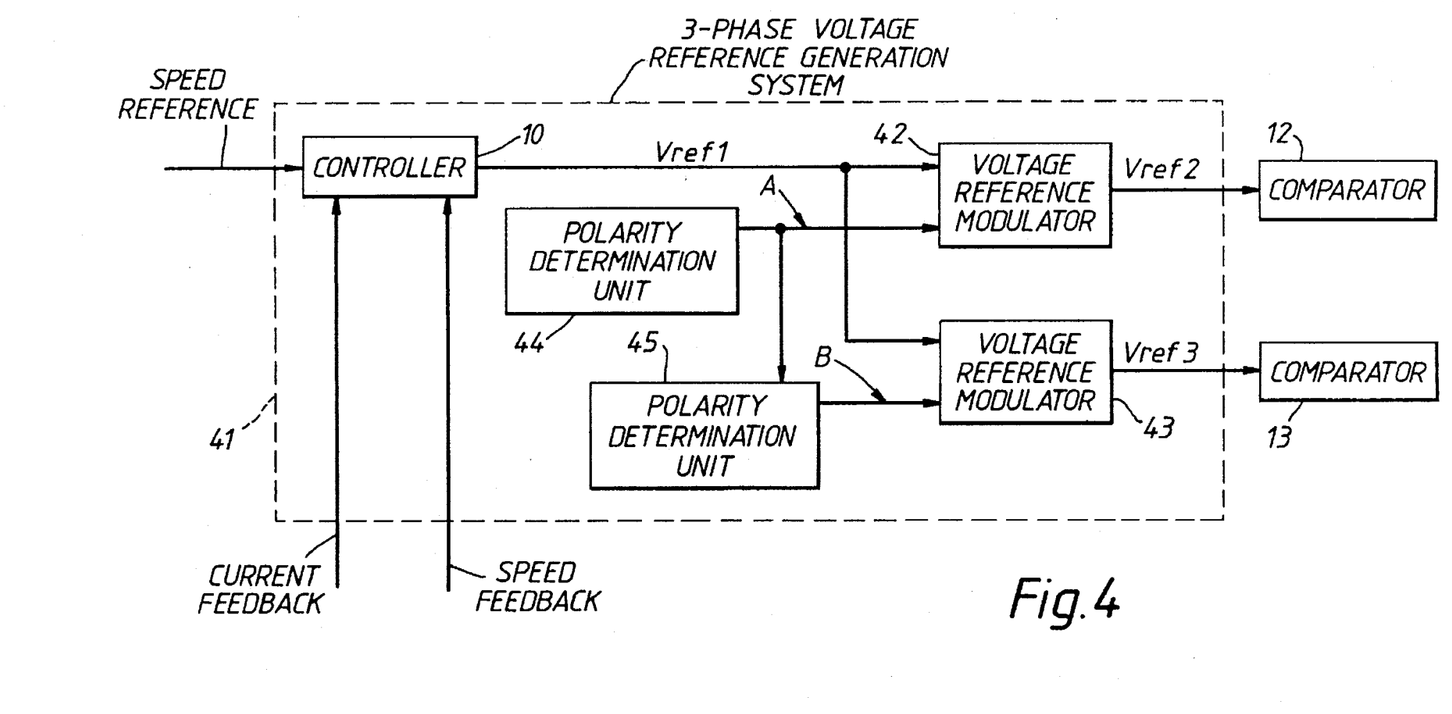
FIG. 4 is a schematic block diagram of 3-phase voltage reference generation system 41 to illustrate the essential points of a power converter according to a third embodiment of this invention.

FIG. 4 is a drawing to illustrate a power converter according to a third embodiment of this invention. In this embodiment, 3-phase voltage reference generation system 16 in the first embodiment shown in FIG. 1 is substituted by a 3-phase voltage reference generation system 41 shown in FIG. 4. In FIG. 4 3-phase voltage reference generation system 41 is composed of controller 10, first and second voltage reference modulators 42 and 43 and first and second polarity determination units 44 and 45. In this case, the rolling mill composed of first motor 31 and second motor 32 shown in FIG. 3 is used as the load of NPC inverters 5 and 6.

In FIG. 4, 3-phase voltage reference Vref1 obtained from controller 10 in the same way as in the first embodiment is inputted to as an original voltage reference first voltage reference modulator 42 and second voltage reference modulator 43.

First polarity determination unit 44 is composed of a counter, and generates a polarity switching signal A, which is switched between "0" and "1" at a constant cycle. Polarity switching signal A is outputted to first voltage reference modulator 42.

First voltage reference modulator 42 judges the case when polarity switching signal A is "0" to be "Positive Mode" and judges the case when it is "1" to be "Negative Mode".

Also, polarity switching signal A is outputted to second polarity determination unit 45, which generates a polarity switching signal B by shifting polarity switching signal A ½ cycle time-wise.

Polarity switching signal B is outputted to second voltage reference modulator 43, which judges the case when polarity switching signal B is "0" to be "Positive Mode" and judges the case when it is "1" to "Negative Mode".

Figure 5:
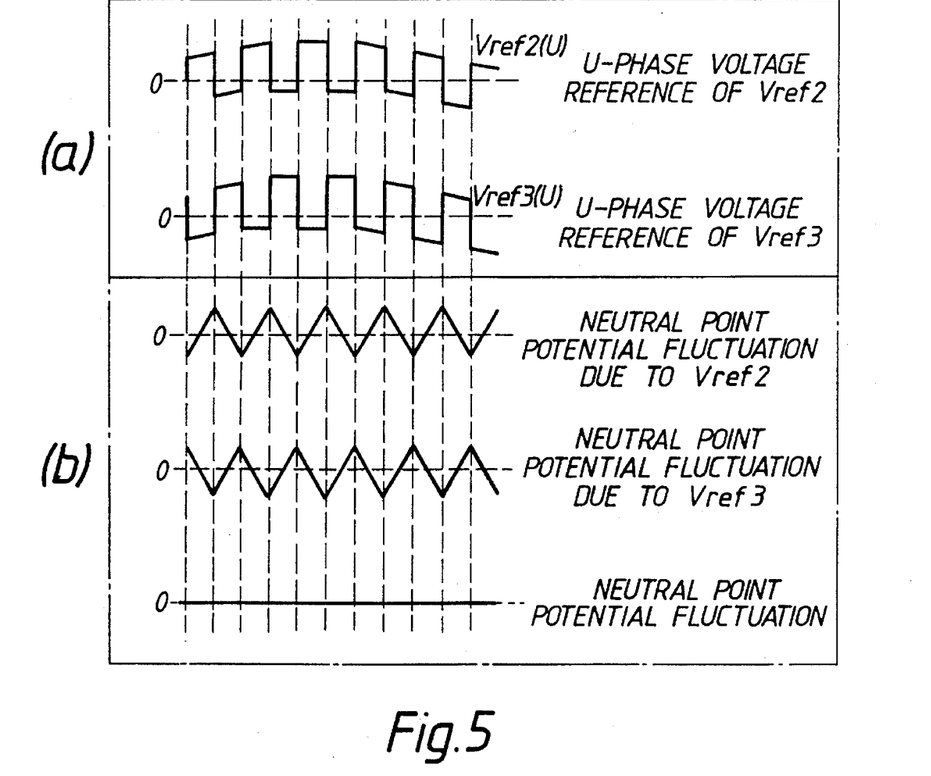
FIG. 5 is a wave-form chart of the voltage references and the neutral point potentials to illustrate the operation of the third embodiment shown in FIG. 4.

Next, in each of the respective voltage reference modulators 42 and 43, a DC bias is added to 3-phase voltage reference Vref1 in the case of "Positive Mode", and new 3-phase voltage references Vref2 and Vref3 are obtained in which all 3 phases of the 3-phase voltage references Vref2 and Vref3 are made the same positive polarity. In each of the respective voltage reference modulators 42 and 43, in the case of "Negative Mode", new 3-phase voltage references Vref2 and Vref3 are obtained in which all 3 phases of the 3-phase voltage references Vref2 and Vref3 are made the same negative polarity by subtracting a DC bias from 3-phase voltage reference Vref1. FIG. 5(a) shows the waveforms of 3-phase voltage references Vref2 and Vref3 (only U phases thereof are illustrated.) at this time.

3-phase voltage references Vref2 and Vref3 are supplied to comparators 12 and 13, respectively. Then, the same operation as in FIG. 1 will be executed.

When using the third embodiment, composed as above, the following operational effects can be obtained. That is to say, polarity switching signals A and B are shifted ½ cycle from each other. Therefore, when first voltage reference modulator 42 is in "Positive Mode", second voltage reference modulator 43 is in "Negative Mode", and when the former is in "Negative Mode", the latter is in "Positive Mode".

FIG. 5(b) is a drawing to illustrate the neutral point potential fluctuation in that case. In the period of "Positive Mode" when all the 3-phase voltage references are positive, the neutral point potential rises linearly, and conversely in the period of "Negative Mode" when all are negative, the neutral point potential falls linearly. Thus, the neutral point potential fluctuations due to the 2 NPC inverters 5 and 6 cancel each other out.

This embodiment can also be used with a load such as a motor possessing 2 sets of 3-phase windings, with the windings of the 2 sets arranged in parallel, for example as shown in FIG. 10.

Figure 6:
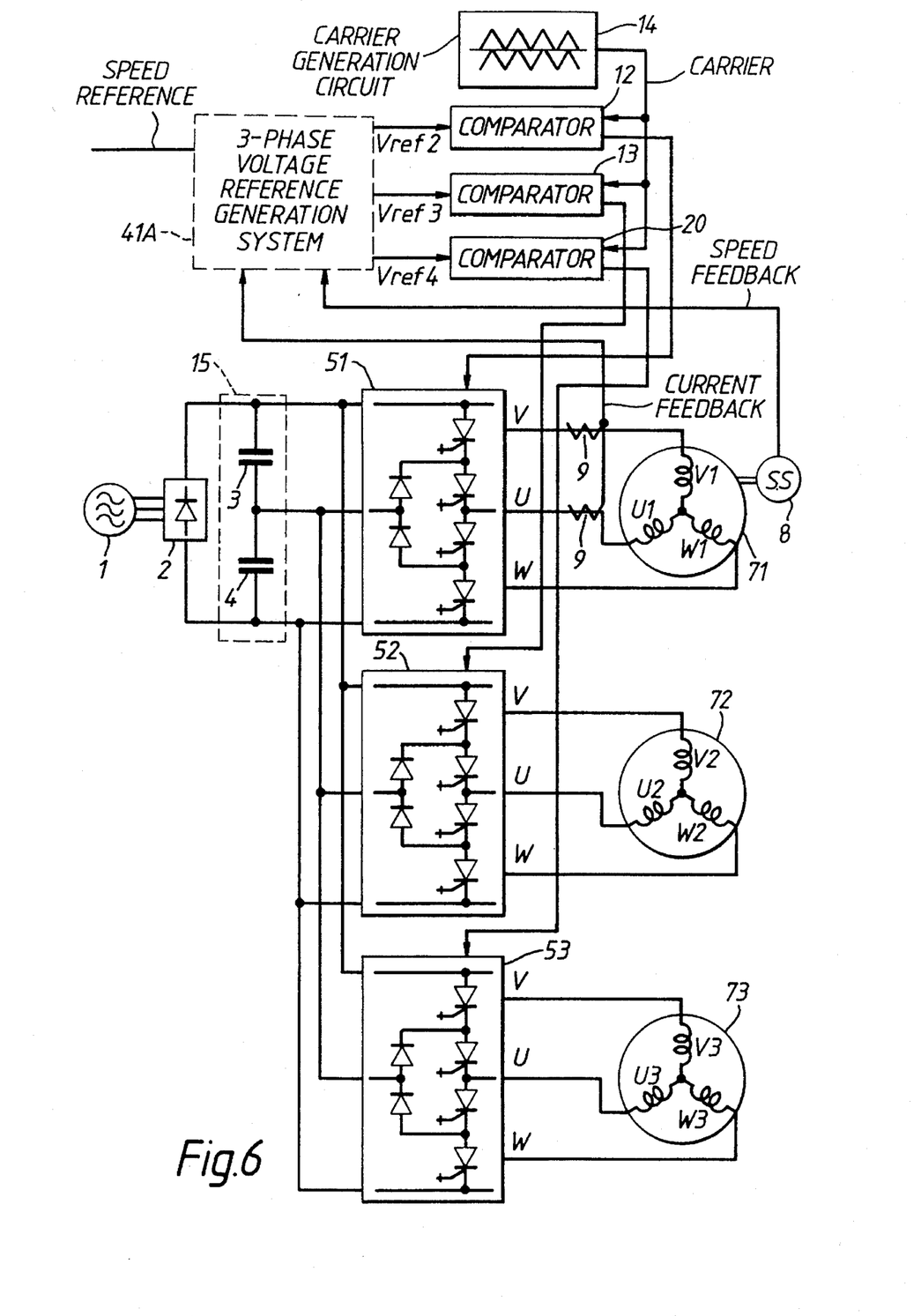
FIG. 6 is a schematic block diagram showing a power converter according to a fourth embodiment of this invention.
Figure 7:
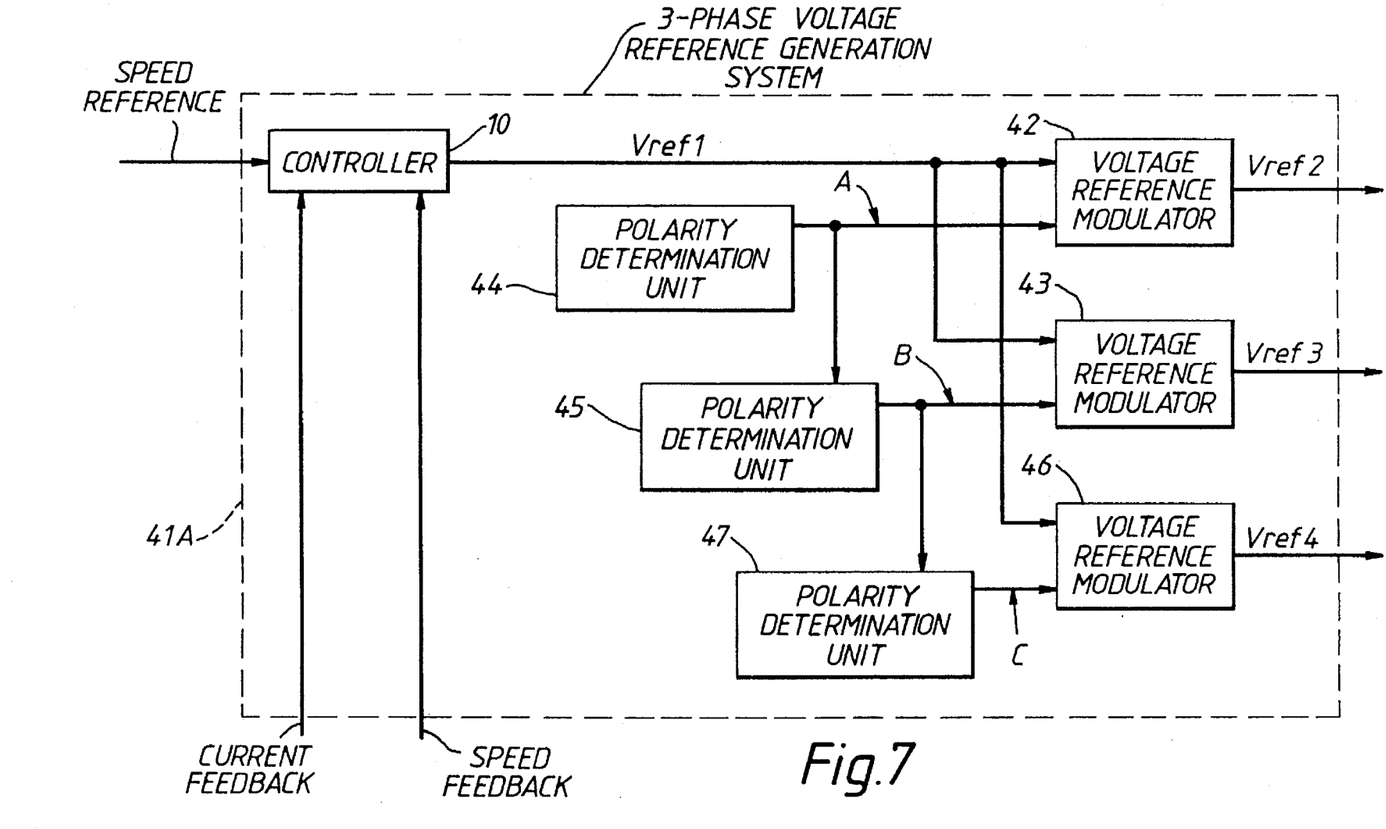
FIG. 7 is a block diagram to illustrate 3-phase voltage reference generation system 41A shown in FIG. 6.
Figure 8:
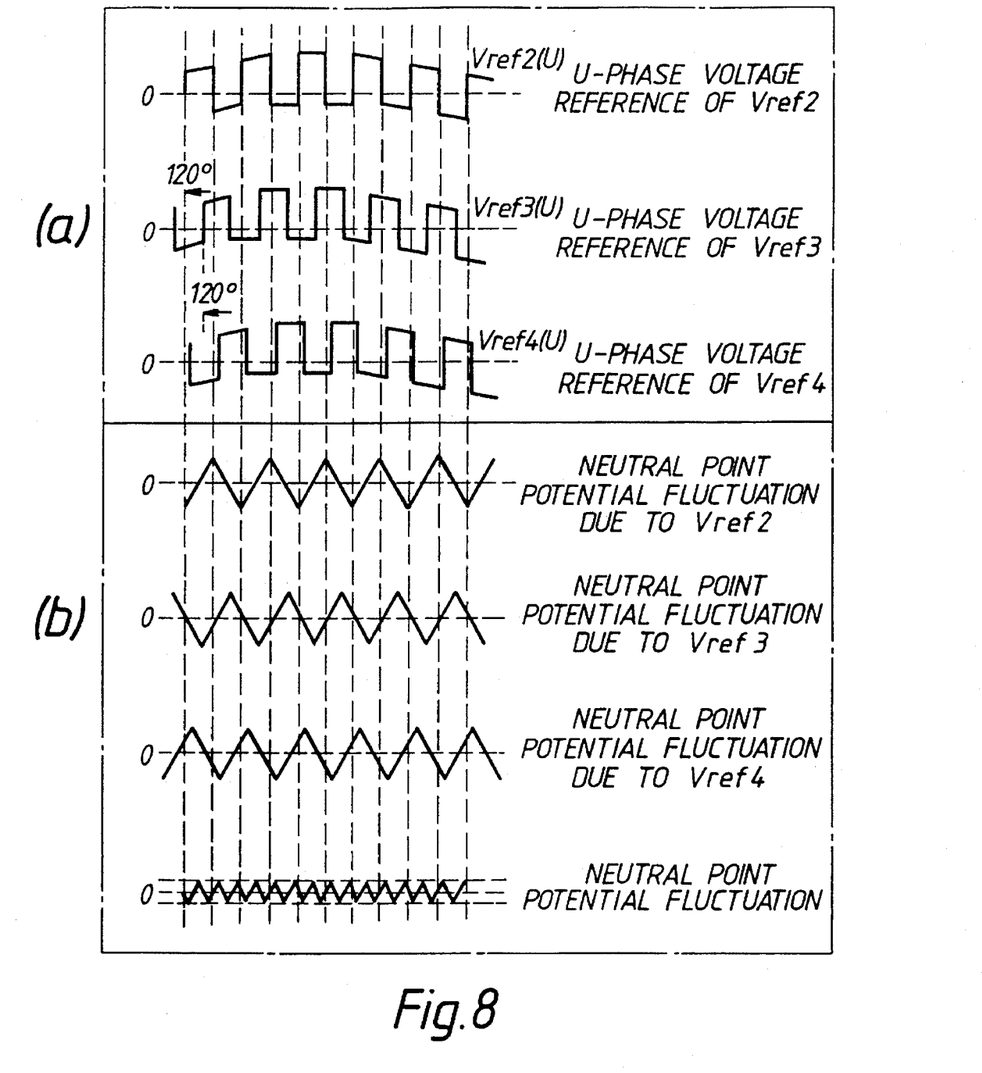
FIG. 8 is a wave-form chart of the voltage references and the neutral point potentials to illustrate the operation of the embodiment shown in FIG. 6.

FIGS. 6–8 are drawings to illustrate a power converter according to fourth embodiment of this invention. FIG. 6 is a schematic block diagram. FIG. 7 is a drawing to illustrate a 3-phase voltage reference generation system 41A shown in FIG. 6. FIG. 8 is a wave-form chart to illustrate the operation of the power converter shown in FIG. 6.

This embodiment employs first–third motors 71, 72 and 73 as the load. First–third NPC inverters 51, 52 and 53 are arranged on the input sides of, and are respectively electrically connected to, these motors 71, 72 and Third comparator 20 is provided in addition to first and second comparators 12 and 13 shown in FIG. 1. Furthermore, 3-phase voltage reference generation system 41A is provided instead of 3-phase voltage reference generation system 16 shown in FIG. 1.

3-phase voltage reference generation system 41A is constructed as follows. That is to say, a new third polarity determination unit 47 and a new third voltage reference modulator 46 are added to 3-phase voltage reference generation system 41 shown in FIG. 4. In this case, 3-phase voltage reference Vref1 is inputted to as an original voltage reference first voltage reference modulator 42, second voltage reference modulator 43 and third voltage reference modulator 46.

First polarity determination unit 44 is composed of a counter, and generates polarity switching signal A, which is switched between "0" and "1" at a constant cycle. Polarity switching signal A is outputted to first voltage reference modulator 42.

First voltage reference modulator 42 judges the case when polarity switching signal A is "0" is to be "Positive Mode" and judges the case when it is "1" to be "Negative Mode".

Also, polarity switching signal A is outputted to second polarity determination unit 45, which generates polarity switching signal B by shifting polarity switching signal A ⅓ cycle time-wise.

In the same way, polarity switching signal B is outputted to third polarity determination unit 47, which generates a polarity switching signal C by shifting polarity switching signal B ⅓ cycle time-wise. Polarity switching signals B and C are outputted to voltage reference generators 43 and 46, respectively. Second and third voltage reference modulators 43 and 46 judge the case when polarity switching signals B and C are "0" to be "Positive Mode" and judge the case when polarity switching signals B and C are "1" to be "Negative Mode", respectively.

Next, in each of the respective voltage reference modulators 42, 43 and 46, a DC bias is added to the 3-phase voltage reference Vref1 in the case of "Positive Mode", and new 3-phase voltage references Vref2, Vref3 and Vref4 are obtained in which all 3 phases of the 3-phase voltage references Vref2, Vref3 and Vref4 are made the same positive polarity. In each of the respective voltage reference modulators 42, 43 and 46, in the case of "Negative Mode", new 3-phase voltage references Vref2, Vref3 and Vref4 are obtained in which all 3 phases of the 3-phase voltage references Vref2, Vref3 and Vref4 are made the same negative polarity by subtracting a DC bias from 3-phase voltage reference vref 1.

FIG. 8(a) shows the wave-forms of 3-phase voltage references Vref2, Vref3 and Vref4 (only U phases thereof are illustrated.) at this time.

When using the fourth embodiment, described above, the following operational effects can be obtained. That is to say, polarity switching signals A, B and C are shifted 1/3 cycle from each other. Therefore, as shown in FIG. 8(b), the neutral point potential fluctuation is controlled to 1/3 of the neutral point potential fluctuation due to one NPC inverter by the three NPC inverters 51, 52 and 53.

Figure 9:
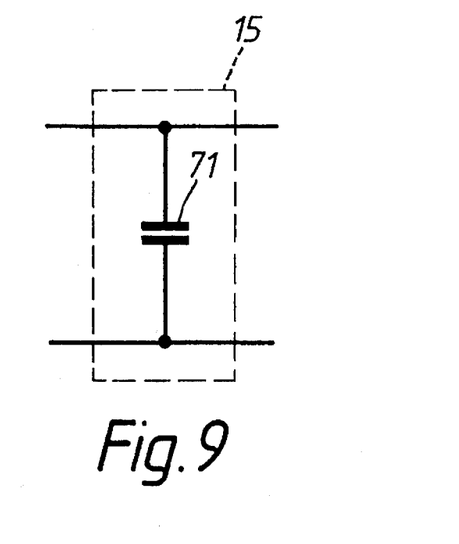
FIG. 9 is a composition drawing of DC smoothing capacitor 15 to illustrate the essential points of a power converter according to a fifth embodiment of this invention.

FIG. 9 is a drawing to illustrate a power converter according to a fifth embodiment of this invention. Smoothing capacitors 3 and 4 in DC smoothing capacitor 15 of the first embodiemnt shown in FIG. 1 is substituted by a capacitor 71. Also, the connections between the neutral points of NPC inverters 5 and 6 and the connection point of the smoothing capacitors 3 and 4 are omitted. Only the neutral points of NPC inverters 5 and 6 are connected each other. In this composition also, in the case when the current of first NPC inverter 5 is flowing into or out from the neutral point, the current of the second NPC inverter 6 is always flowing out from or into the neutral point, respectively. Therefore, as the following current loop is always present, the neutral point of the NPC inverters 5 and 6 becomes 0 potential via the windings of motor 7.

One example of the current loop is as follow: the plus side terminal of three-phase AC power source 1—the U phase of first NPC inverter 5—motor winding U1 of the first set of motor 7—the V phase of first NPC inverter 5—the neutral point of first NPC inverter 5—the V phase of second NPC inverter 6—motor winding V2 of the second set of motor 7—the U phase of second NPC inverter 6—the minus side terminal of three-phase AC power source 1.

When using the fifth embodiment described above, the effect of reducing the number of smoothing capacitors is obtained in addition to the effects of the first embodiment.

It is very easy to construct voltage reference modulators 42, 43 and 46, and polarity determination units 44, 45 and 47 for those skilled in the art, so the detailed description of the circuit construction thereof may be omitted.

When using this invention, a power converter in which a plurality of NPC inverters are connected to a common DC power source can be provided, which enables to suppress the neutral point potential fluctuation generated due to the currents of each NPC inverter.

Obviously, numerous modifications and variations of the present invention are possible in light of the above teachings. It is therefore to be understood that within the scope of the appended claims, the invention may be practiced otherwise than as specifically described herein.

What is claimed is:

1. A power converter for converting DC power from a DC source to AC power to supply an AC load, the power converter comprising:

plural neutral point inverters connected between the DC source and the AC load;

means for generating a first voltage reference;

means for generating a second voltage reference by shifting a phase of said first voltage reference based on an inverter phase difference between said inverters, the phase difference being based upon a number of said inverters and a number of AC phases of each inverter; and means for respectively comparing an amplitude of said first and second voltage references to an amplitude of a carrier signal and for generating gate signals for output to control said inverters based on the comparison result.

2. The power converter according to claim 1, wherein:

said load is an AC motor having plural sets of windings, a motor phase difference being based on a number of said winding sets and a number of AC motor phases; and said inverter phase difference being equal to said motor phase difference.

3. The power converter according to claim 1, wherein:

said inverter phase difference equals 360°/(N×K), where N is the number of said inverters and K is the number of said phases of each of said inverters.

4. The power converter according to claim 3:

wherein said load is an AC motor;

wherein said first voltage reference generating means includes a controller for generating said first voltage reference based on a speed reference for said motor, a speed of said motor, and a current flowing in said motor; and wherein said second voltage reference generating means includes a phase modulator connected to receive said first voltage reference for shifting the phase of said first voltage reference.

5. The power converter according to claim 4, wherein:

said motor is a three-phase motor;

said power converter includes two neutral point clamped inverters; and said phase modulator shifts a phase of said first voltage reference by 180° to generate said second voltage reference.

6. A power converter, comprising:

a DC voltage source;

a plurality of neutral point clamped inverters connected to said DC voltage source;

means for generating an original voltage reference and a plurality of voltage references with a phase difference therebetween;

said voltage references including a positive voltage reference produced by shifting said original voltage reference by a positive DC bias value in a positive mode and a negative voltage reference produced by shifting said original voltage reference by a negative DC bias value in a negative mode, said phase difference being based on a number of said inverters;

means for generating polarity switching signals for switching between said positive mode and said negative mode at a predetermined cycle rate; and gate signal generating means connected to receive said plurality of said voltage references for generating a plurality of gate signals, the gate signals being respectively supplied to control said inverters in supplying AC power to a load.

7. The power converter according to claim 6, wherein the load is an AC motor, and wherein said voltage reference generating means includes:

a controller for generating the original voltage reference based on a speed reference for said motor, a speed of said motor and a current flowing in said motor; and a plurality of voltage reference modulators for generating said plurality of voltage references, each of said voltage reference modulators receiving said original voltage reference and respective ones of said polarity switching signals producing said positive voltage reference by shifting said original voltage reference by said DC bias value in said positive mode, producing said negative voltage reference by shifting said original voltage reference by said negative DC bias value in said negative mode, and generating said positive voltage reference in said positive mode and said negative voltage reference in said negative mode as said plurality of voltage references.

8. The power converter according to claim 7, wherein:

said power converter includes two neutral point clamped inverters;

said means for generating polarity switching signals generates two polarity switching signals with a phase difference of 180°; and said plurality of voltage reference modulators includes two voltage reference modulators for generating said positive and negative voltage references.

9. The power converter according to claim 7, wherein:

said power converter incudes three neutral point clamped inverters;

said means for generating polarity switching signals generates three polarity switching signals with a phase difference of 120°; and said plurality of voltage reference modulators includes three voltage reference modulators for generating three voltage references.

10. A power converter for converting DC power from a DC source to AC power to supply an AC load, the power converter comprising:

plural neutral point inverters connected between the DC source and the AC load;

means for generating a first voltage reference;

means for generating a polarity signal;

means for generating a second voltage reference based on said first voltage reference and said polarity signal; and comparing means for respectively comparing an amplitude of said first and second voltage reference to an amplitude of a carrier signal and for generating gate signals for output to control said inverters based on the comparison result.

* * * * *